United States Patent [19]

Collette

[11] Patent Number: 5,077,111

[45] Date of Patent: Dec. 31, 1991

[54] RECYCLABLE MULTILAYER PLASTIC PREFORM AND CONTAINER BLOWN THEREFROM

[75] Inventor: Wayne N. Collette, Merrimack, N.H.

[73] Assignee: Continental PET Technologies, Inc., Florence, Ky.

[21] Appl. No.: 464,010

[22] Filed: Jan. 12, 1990

[51] Int. Cl.⁵ ............................................. B65D 23/00
[52] U.S. Cl. ................................... 428/36.7; 215/12.1; 428/475.2; 428/542.8
[58] Field of Search ................. 428/36.7, 542.8, 475.2; 215/12.1

[56] References Cited

U.S. PATENT DOCUMENTS

| | | | |
|---|---|---|---|
| 4,550,043 | 10/1985 | Beck | 428/36.7 |
| 4,609,516 | 9/1986 | Krisnakumar et al. | 264/255 |
| 4,728,549 | 3/1988 | Shimizu et al. | 428/36.7 |
| 4,847,129 | 7/1989 | Collette et al. | 428/36.7 |
| 4,936,473 | 6/1990 | Nahill et al. | 428/36.7 |

Primary Examiner—James J. Seidleck
Attorney, Agent, or Firm—Charles E. Brown

[57] ABSTRACT

This relates to a multilayer preform and a container blow molded from such preform wherein both the preform and the container are of a multilayer construction with there being utilized as an oxygen scavanger and oxygen barrier and a blend of either PET/MXD-6 nylon or PET/MXD-6 nylon/Co. In the resultant container, the percentage of MXD-6 nylon will be less than 1% and the container will be directly recyclable. Also, the percentage of MXD-6 nylon in the container will be such that there will be no noticable reduction in the clarity of the container. Also, because PET forms a part of the blend which provides the oxygen scavanger and barrier, the layers in the container will be bonded to one another.

15 Claims, 1 Drawing Sheet

RECYCLABLE MULTILAYER PLASTIC PREFORM AND CONTAINER BLOWN THEREFROM

This invention relates in general to new and useful improvements in plastic preforms from which plastic containers are blow molded, and most particularly to a plastic preform which is of a multilayer construction including oxygen barrier layers and wherein both the preform and a container blow molded therefrom is directly recyclable.

Polyethylene terephythalate (PET) preforms and containers blow molded from such preforms are well known. However, PET per se does not have all of the necessary $O_2$ permeation characteristics desired for food containers. j Accordingly, there has been developed a laminated preform which is at least in part of a five layer construction including PET inner and outer layers, a PET core layer and inner and outer intermediate barrier layers. The patent to Krishnakumar et al 4,609,516 granted Sep. 2, 1986, and the patent to Beck 4,550,043 granted Oct. 29, 1985, are typical recent patents relating to such laminated preforms and containers blow molded therefrom.

In recent years MXD-6 nylon has been utilized as a material in multilayer preforms. Further, most recently there has been developed single layer preforms formed of a blend of PET, MXD-6 nylon and cobalt wherein the blend has oxygen scavaging capabilities and functions as an improved oxygen barrier vs monolayer PET.

The PET/MXD-6 nylon blend may also include a cobalt (Co) derivative which catalyses the reaction of the MXD-6 nylon with oxygen passing through the container wall. The cobalt may be present in the form of carboxylic acid salt. While PET/MXD-6 nylon blends and PET/MXD-6 nylon/Co blends have been acceptable for bottles in Europe, such blends are unsuitable commercially at the present in the United States for several reasons and most particularly will be unsuitable for use in the future in that they cannot be easily recycled.

The present single layer PET/MXD-6 nylon blends required a minimum of 4 % MXD-6 nylon. Although injection molded preforms formed of such blends are clear, when the preforms are stretched blow molded into containers, due to phase separation occurring during orientation of the blend, there is a loss of clarity making such containers commercially unacceptable for many uses.

Further, because of the loss of clarity in the containers, the containers are not suitable for direct recycling unless blended at a 3 or 4 to 1 ratio with monolayer PET containers.

In addition, when the blend includes cobalt, since the preform and the resultant container are of a single layer construction, the cobalt is in direct contact with the product which is desirable in some applications.

In accordance with this invention, presently utilized barrier layers in a five layer PET/EVOH structure will be replaced by PET/MXD-6 nylon and PET/MXD-6 nylon/Co blends will be utilized as the material to form the required barrier layers.

With the above and other objects in view that will hereinafter appear, the nature of the invention will be more clearly understood by reference to the following detailed description, the appended claims, and the several views illustrated in the accompanying drawings.

Figure 1:
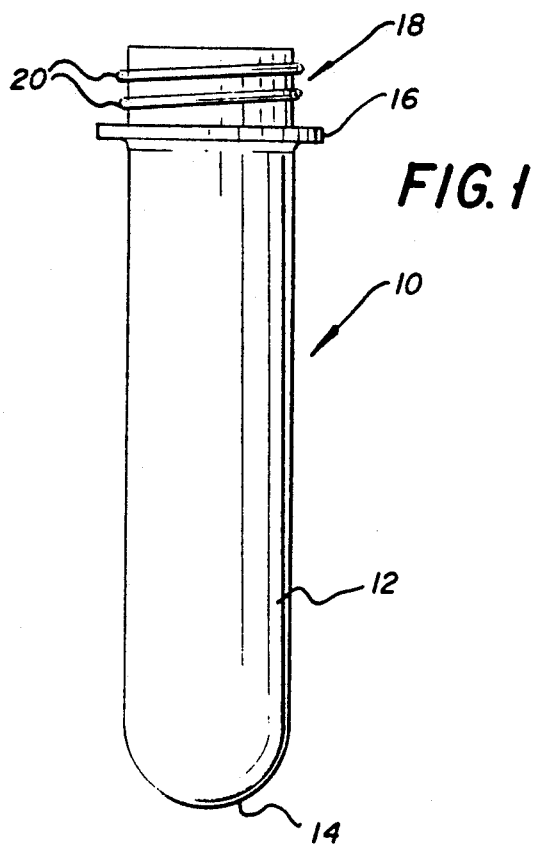
FIG. 1 is an elevational view of a plastic preform formed in accordance with this invention.

Referring now to the drawings in details, it will be seen that there is illustrated in FIG. 1 a preform, generally identified by the reference numeral 10, in accordance with this invention. The preform 10 is preferably made in accordance with the disclosures of the aforementioned patent numbers 4,550,043 and 4,609,516.

Figure 2:
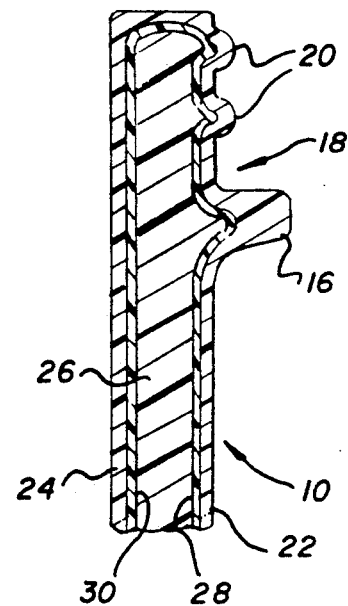
FIG. 2 is a sectional view taken through the wall of the upper part of the preform and shows a typical arrangement of a plurality of layers of materials in such preform.

The preform 10 is of a two material, five layer construction with a typical cross section of an upper portion of the preform being shown in FIG. 2.

The preform 10, as shown in FIG. 1 includes a body 12 which terminates in a rounded, generally hemispherical, lower end 14. The body 12 terminates in a support or capping flange 16 and above the capping flange 16 is a neck finish, generally identified by the numeral 18 which may include threads 20 or other closure retaining means.

The layers of the preform 10 include an outer layer 22, an inner layer 24 and a core layer 26. The preform also includes an outer intermediate layer 28 and an inner intermediate layer 30.

In a preferred embodiment of the invention, the outer layer 22 and the inner layer 24 will be formed of PET as will the core layer 26. The intermediate layers 28 and 30 are formed differently from the prior art disclosures in that each of these two layers will be formed of a blend of PET/MXD-6 nylon or PET/MXD-6 nylon/Co. In each of these blends, the percentage of MXD-6 nylon may be as high as 25 to 75%. The percentage of the MXD-6 nylon in the blend will be restricted to one where there will be no loss of clarity in the finished blow molded container and the percentage of the MXD-6 nylon in the entire preform will not exceed 1%. In the blend containing cobalt, the same general ratio of MXD-6 nylon will exist with the cobalt preferably being on the order of 5–50 parts per million (ppm). The blend will constitute on the order of 1 to 8% of the total material with the preferred percentage being 4.

The net result is that the intermediate layers 28, 30 will have an oxygen scavaging effect and may function as oxygen barriers.

Figure 3:
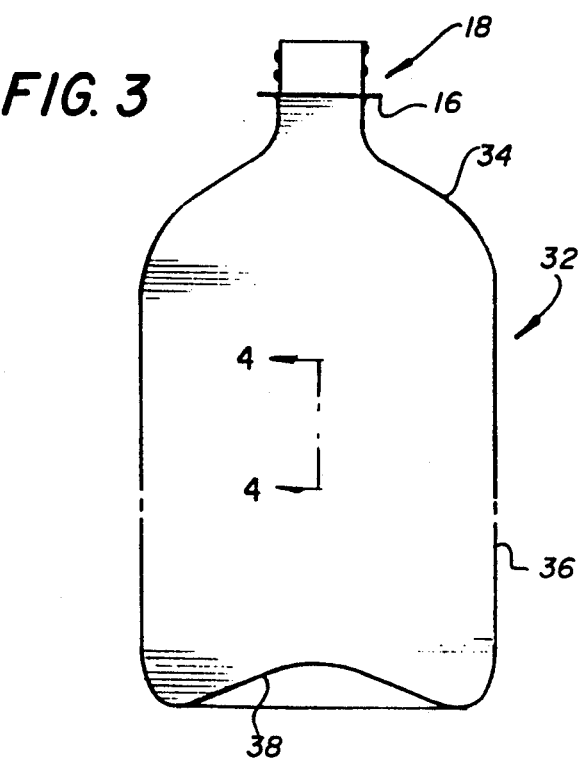
FIG. 3 is an elevational view of a container blow molded from the preform of FIG. 1 with an intermediate part of the container body broken away.

It is also to be understood that the large percentage of the MXD-6 nylon in the blends will not cause any noticable loss of clarity when the preform 10 is blow molded to form a container, such as the container 32 of FIG. 3 due to the thinness of the layers 28, 30.

It is also pointed out here that while generally speaking the cross section of the preform will be that shown in the lower part of FIG. 2, it is feasible to vary the cross section of the preform from a layer standpoint as is disclosed in co-pending U.S. Application Ser. No. 07/292,440 filed on Dec. 30, 1988, and now U.S. Pat. No. 4,954,376, of which I am co-inventor.

Figure 4:
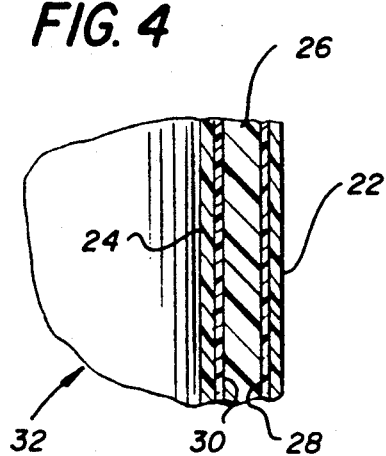
FIG. 4 is an enlarged fragmentary vertical sectional view taken through the body of the preform of FIG. 3 generally along the line 4—4 and shows a typical five layer construction utilized in the container of FIG. 3.

Reference is now made specifically to FIGS. 3 and 4 wherein there is illustrated the details of the container 32 which includes the neck finish 18, the support flange 16, a shoulder portion 34, a body 36 and a base 38.

The typical cross section of a wall of the container 32 will be similar to that of the preform 10 with thicknesses being reduced on the order of 10. In addition to the utilization of the PET/MXD-6 nylon or PET/MXD-6 nylon/Co blend, the container 32 will distinguish over prior art containers in that the blends have characteristics wherein the intermediate layers 28, 30 will bond to respective ones of the layers 22, 24 and the core layer 26 when the preform 10 is blow molded.

Not only will the container 32 be directly recyclable, it will have all the desirable characteristics of prior similar containers, be more economical as to cost of materials and further will not be subject to layer separation. In addition, the cobalt will remain at all times remote from the product so as to pose no problem.

Although only a preferred embodiment of the invention has been specifically illustrated and described herein, it is to be understood that minor variations may be made in the blends, the layer arrangements of the preform and container, and the configuration of the preform and the container without departing from the spirit and scope of the invention as defined by the appended claims.

I claim:

1. A plastic preform for blow molding into a plastic container, said preform including a body, a base and a neck finish, at least a portion of said preform being only of a five layer construction and consisting of inner and outer layers, a core layer and inner and outer intermediate layers, said inner and outer layers and said core layer being formed of PET, and said inner and outer intermediate layers being formed of a blend of PET and nylon, said blend having oxygen absorbing characteristics and forming oxygen barriers, wherein the percentage of nylon in said preform being one wherein containers stretch blow molded from said preform are clear, and said preform and a container formed from said preform are directly recyclable as preforms for containers.

2. A plastic preform according to claim 1 wherein said nylon is MXD-6 nylon.

3. A plastic preform according to claim 2 wherein said MXD-6 nylon constitutes no greater than on the order of 1% by volume of the total material of said preform.

4. A plastic preform according to claim 2 wherein the percentage of MXD-6 nylon constitutes on the order of 25 to 75% by volume of the material forming said inner and outer intermediate layers.

5. A plastic preform according to claim 4 wherein the material of said blend constitutes on the order of 1 to 8% by volume of the total material of said preform.

6. A plastic preform according to claim 1 wherein the material of said blend constitutes on the order of 4% by volume of the total material of the preform.

7. A plastic preform according to claim 1 wherein the material of said blend constitutes on the order of 1 to 8% by volume of the total material of said preform.

8. A plastic preform according to claim 2 wherein said blend of PET and MXD-6 nylon includes a quantity of Co.

9. A plastic preform according to claim 8 wherein the percentage of said MXD-6 nylon and Co in said preform is such wherein said preform and container formed from said preform are directly recyclable.

10. A plastic preform according to claim 8 wherein said Co constitutes on the order of 5-50 ppm of said preform.

11. A plastic preform according to claim 8, wherein said Co constitutes on the order of 5-50 ppm of said preform, and said MXD-6 nylon constitutes no greater than on the order of 1% by volume of the total material of said preform.

12. A plastic preform according to claim 10 wherein said MXD-6 nylon constitutes no greater than on the order of 1% by volume of the total material of said preform.

13. A container blow molded from the preform of claim 1.

14. A container according to claim 13 wherein said layers are bonded to one another.

15. A container blow molded from the preform of claim 8.

* * * * *